United States Patent [19]

Sugioka et al.

[11] Patent Number: 5,172,378
[45] Date of Patent: Dec. 15, 1992

[54] ERROR DETECTION METHOD AND APPARATUS FOR PROCESSOR HAVING MAIN STORAGE

[75] Inventors: Masayuki Sugioka, Hadano; Yoshikazu Mori, Yokohama; Hiroyuki Hidaka, Hadano; Fumio Enmei, Kiryuu, all of Japan

[73] Assignees: Hitachi, Ltd.; Hitachi Computer Engineering Co., Ltd.; Hitachi Electronic Services, Co., Ltd., Tokyo, all of Japan

[21] Appl. No.: 520,644

[22] Filed: May 8, 1990

[30] Foreign Application Priority Data

May 9, 1989 [JP] Japan .................................. 1-116977

[51] Int. Cl.⁵ .............................................. G06F 11/00
[52] U.S. Cl. .................................. 371/251; 371/16.1; 371/18
[58] Field of Search ................... 371/25.1, 16.1, 37.7, 371/47.1, 12, 16.5, 18; 364/900 MS File, 200 MS File, 267.1 MS, 267.6 MS

[56] References Cited

U.S. PATENT DOCUMENTS

| | | | |
|---|---|---|---|
| 3,838,260 | 9/1974 | Nelson | 371/16.5 |
| 3,930,146 | 12/1975 | Bogacz | 371/16.1 |
| 4,096,561 | 6/1978 | Trinchieri | 364/200 |
| 4,127,768 | 11/1978 | Negi et al. | 371/16.1 |
| 4,173,787 | 11/1979 | Kotoma et al. | 364/550 |
| 4,334,307 | 6/1982 | Bourgeois et al. | 371/16.5 |
| 4,443,849 | 4/1984 | Ohwada | 371/12 |
| 4,550,406 | 10/1985 | Neal | 371/22.6 |
| 4,710,894 | 12/1987 | Kobo et al. | 364/900 |
| 4,819,233 | 4/1989 | Delucia et al. | 371/19 |
| 4,852,092 | 7/1989 | Makita | 371/16.5 |
| 4,961,053 | 10/1990 | Krug | 371/25.1 |
| 4,982,402 | 1/1991 | Beaven et al. | 371/16.1 |
| 4,987,537 | 1/1991 | Kawata | 364/200 |

*Primary Examiner*—Robert W. Beausoliel
*Assistant Examiner*—Phung My Chung
*Attorney, Agent, or Firm*—Fay, Sharpe, Beall, Fagan, Minnich & McKee

[57] ABSTRACT

In an information processor having a central processing unit, a main storage which is accessed by the central processing unit, and an input/output processing unit which controls transfer of information between the central processing unit as well as the main storage and exterior of the information processor; a memory area of the main storage is partitioned into a software area and a hardware area, a train of instructions for inspecting the central processing unit, the main storage and the input/output processing unit are stored in the hardware area, and the central processing unit executes a program stored in the software area and the instruction train stored in the hardware area, alternately at desired intervals so as to decide existence or nonexistence of occurrence of an error on the basis of an executed result of the instruction train.

10 Claims, 4 Drawing Sheets

# ERROR DETECTION METHOD AND APPARATUS FOR PROCESSOR HAVING MAIN STORAGE

BACKGROUND OF THE INVENTION

1. Field of the Invention

The present invention relates to error detection techniques, and more particularly to an error detection method and apparatus which are effective when applied to error detection and resumption processes in an information processor.

2. Description of the Prior Art

With the spread of information processors, influences attendant upon the shutdown of the processors are increasing, and it is indispensable to ensure the reliability of the processors for maintaining stable operation.

As an expedient for detecting the error of a central processing unit constituting the information processing system or any peripheral device connected thereto, therefore, microdiagnostics (MD) which decides the existence or nonexistence of the error through the execution of a microprogram has heretofore been common practice as disclosed in, for example, Japanese Patent Application Laid-Open No. 40943/1988 or No. 55645/1988.

More specifically, a microdiagnostic program is described at the level of the microprogram, it is loaded in part of a control storage at, e.g., the start-up of the system together with ordinary microprograms for controlling the operation of the central processing unit, and it is periodically executed, thereby intending to detect the presence of any hardware error.

On the other hand, as a technique for inspecting the information processor in software fashion, an error is detected by periodically starting a test program such as I/O patrol for checking a miscalculation or inspecting an input/output unit, at the level of an operating system by way of example.

SUMMARY OF THE INVENTION

The error detection method which is based on the microdiagnostic program described with microinstructions cannot detect an error which is ascribable to the disorder of logic in, for example, a preceding control during the execution of the microinstructions.

With the method which is based on the test program at the software level of the operating system or the like, even if the error can be detected, it is not one detected in hardware fashion, and hence, it is difficult to obtain detailed hardware information required for the analysis of the error. As another problem, since the test program is generated so as to be shared by several sorts of information processors, the method is incapable of delicate error detection dependent upon logic which is peculiar to the hardware of each individual information processor.

It is therefore an object of the present invention to provide an error detection method and apparatus which can check an error difficult of detection with a microdiagnostic program.

Another object of the present invention is to provide an error detection method and apparatus which can grasp the detailed status of hardware at the occurrence of an error.

Still another object of the present invention is to provide an error detection method and apparatus which can readily transplant a test program into a different information processor having the same instruction scheme.

Typical aspects of performance of the present invention are briefly summarized as follows:

In an information processor having a central processing unit, a main storage which is accessed by the central processing unit, and an input/output processing unit which controls transfer of information between the central processing unit as well as the main storage and exterior of the information processor, a memory area of said main storage is partitioned into a software area and a hardware area, that a train of instructions for inspecting said central processing unit, said main storage and said input/output processing unit are stored in said hardware area, and that said central processing unit executes a program stored in said software area and the instruction train stored in said hardware area, alternately at desired intervals so as to decide existence or nonexistence of occurrence of an error on the basis of an executed result of said instruction train.

According to the present invention described above, the train of instructions to be stored in part of the hardware area of the main storage are described with general instructions, whereby even an error which is difficult of detection with a microdiagnostic program and which is ascribable to, e.g., the disorder of control logic during the execution of a microinstruction can be reliably detected.

In addition, when any error has been detected, the error process routine of a service processor is started by an interruption process as a hardware error detected by the central processing unit, and the operation of recording the status of hardware such as the central processing unit into a console file device is performed in the error process routine. Thus, the status of the hardware at the occurrence of the error is permitted to be grasped in detail, and the analysis of the error, a resumption process, etc. can be performed more appropriately than in an error detection technique which is based on a test program at an ordinary program level.

In addition, since the train of instructions for checking the existence or nonexistence of any error are described with the general instructions, a test program can be readily transplanted into a different information processor having the same instruction scheme, unlike the microdiagnostic program etc. which depend intensely upon the hardware.

PREFERRED EMBODIMENTS OF THE INVENTION

Figure 1:
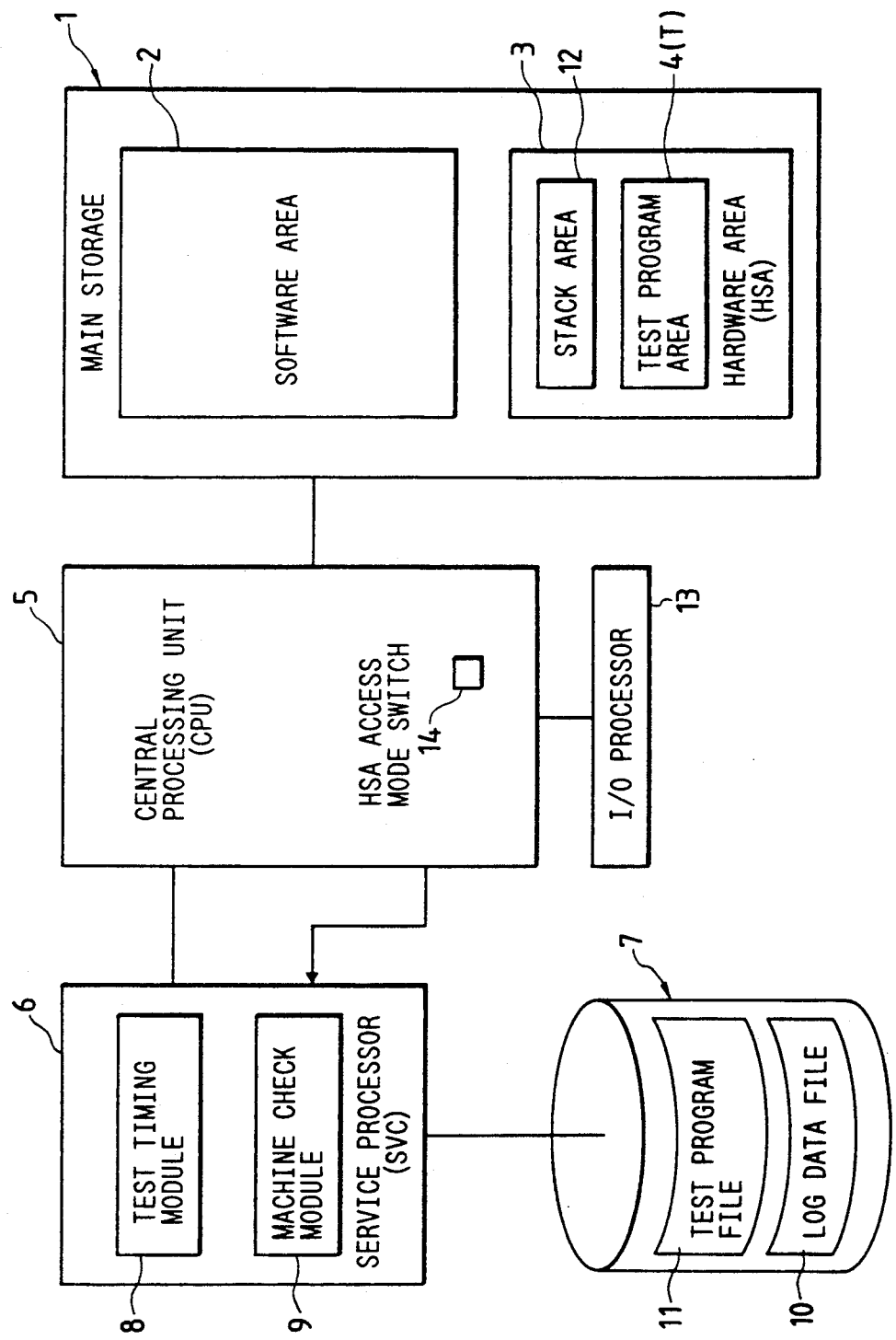
FIG. 1 is a block diagram showing an example of the architecture of an information processor which is one embodiment of the present invention.

Now, embodiments of the present invention will be described in detail with reference to the drawing.

Referring first to FIG. 1, the architecture of an information processor in one embodiment included in an information system will be outlined.

The information processor of this embodiment comprises a central processing unit 5 which performs the control of the whole system, desired arithmetic operations, etc., and a main storage 1 which stores therein an operating system for operating the central processing unit 5 and controlling hardware such as unshown peripheral equipment connected to the information system, the programs of ordinary tasks to be executed under the operating system, and so forth.

Further, an input/output processing unit 13 is connected to the central processing unit 5, and it operates to control the transfer of information between the main storage 1 and the peripheral equipment on the basis of a command from the central processing unit 5.

Also connected to the central processing unit 5 is a service processor 6 which is interposed between the operator of the information system and the central processing unit 5 and which controls the whole system and monitors the operating situation thereof.

The service processor 6 is furnished with a console file device 7 which is constructed of, for example, a magnetic disk device and in which a log data file 10 formed of the information of the operating situation of the whole system, etc. is stored.

The main storage 1 is partitioned into a software area 2 to which the operating system and the general programs (for example, an application program and a user program) are accessible, and a hardware area (HSA short for hardware system area) 3 in which information for managing various hardware constituents such as the peripheral equipment is stored.

Incidentally, the partition of a main storage into a software area and a hardware area is disclosed in "NIKKEI ELECTRONICS" dated Aug. 1, 1983, pp. 105-118.

The general programs are inhibited from accessing the hardware area 3, and the access is controlled by those "ON" and "OFF" statuses of an HSA access mode switch 14 which are controlled by the central processing unit 5. That is, during the execution of any of the general programs, the HSA access switch 14 is "OFF", so that when the general program intends to access the hardware area 3, an access exception takes place.

In this case, the hardware area 3 is provided with a stack area 12 which is used for the saving, restoration etc. of information in a plurality of unshown registers included in the central processing unit 5, and a test program area 4 which stores therein a test program T formed of a plurality of sorts of test routinues Ti (i=1,2,3, ... , n) described in terms of general instructions equivalent to those of the ordinary programs, etc.

The test program T contains a train of instructions for inspecting the central processing unit 5 and and/or the main storage 1 and/or the I/O processing unit 13. It is stored as a test program file 11 in the console file device 7 disposed for the service processor 6, and it is loaded in the test program area 4 of the hardware area 3 at, for example, the start-up of the information system.

In addition, the service processor 6 includes a test timing module 8 which controls the timing of the execution of the test program T, and a machine check module 9 which performs predetermined processes to be described later, at the time of the detection of any error in the information system and so forth. The test timing module 8 requests an interruption into the central processing unit 5 at a rate of, for example, one time in several hundred milliseconds during the execution of any of the ordinary programs, so as to execute the test program T, whereby the monitoring of the presence of any abnormality in the information system, etc. are carried out.

Figure 2:
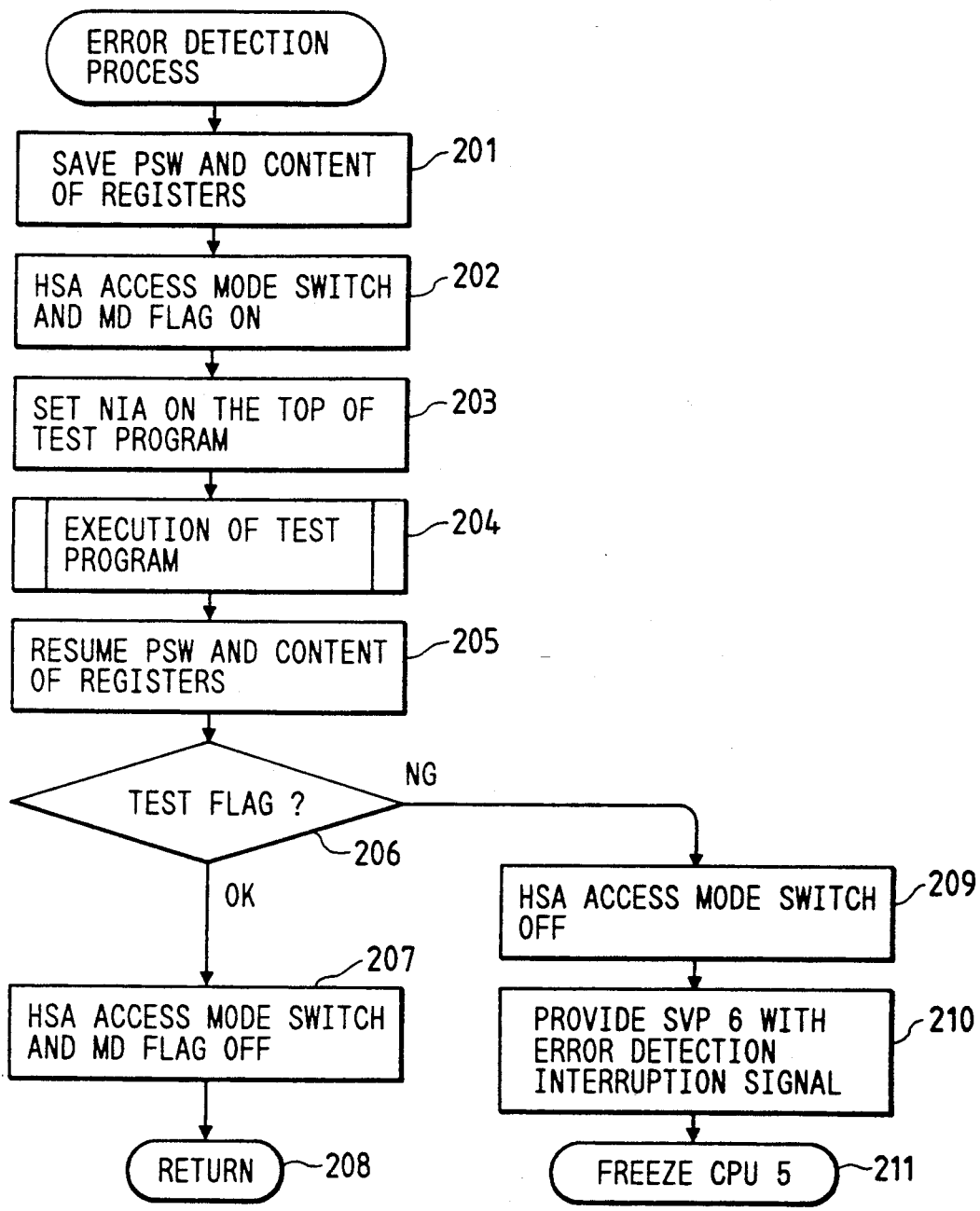
FIG. 2 is a flow chart for explaining an example of the operation of one embodiment of a central processing unit in FIG. 1.

Now, the operation of this embodiment will be described with reference to flow charts in FIGS. 2-4, etc.

First, the test timing module 8 of the service processor 6 performs the process of the interruption into the central processing unit 5. Then, the central processing unit 5 saves the program status word PSW of a program having been executed till then and the contents of registers in the software area 2, into the stack area 12 of the hardware area 3 (step 201), and it turns "ON" the HSA access switch 14 for allowing an access to the hardware area 3 of the main storage 1 and an MD flag for indicating the proceeding of the execution of the test program T (step 202).

Figure 5:
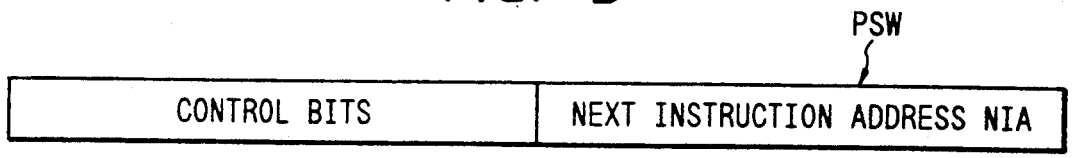
FIG. 5 is an explanatory diagram showing an example of the format of a program status word.

As shown in FIG. 5 by way of example, the program status word PSW is configured of a control bit section in which predetermined control information is expressed by a bit pattern, and a next instruction address section NIA which indicates the address of an instruction to be executed next within the program stored in the main storage 1. The central processing unit 5 sets the address of the test program area 4 in the next instruction address section NIA (step 203), and starts the test program T (step 204).

Figure 3:
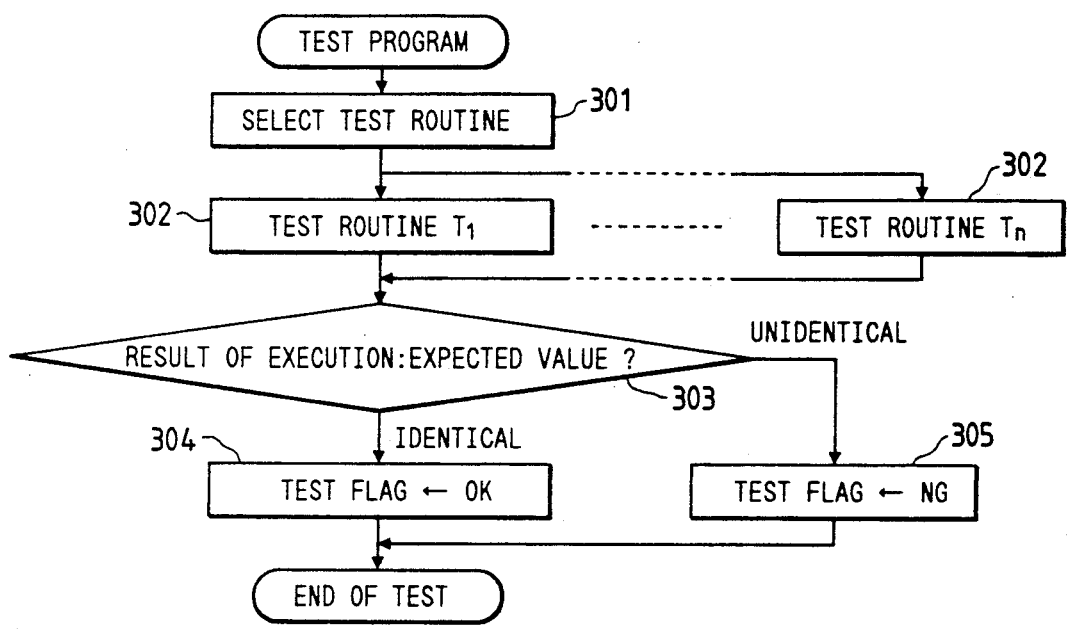
FIG. 3 is a flow chart for similarly explaining an example of the operation of one embodiment of the central processing unit in FIG. 1.

On this occasion, in the test program T, as shown in FIG. 3, one Ti of the plurality of test routines Tn is selected at random using, for example, time-varying random numbers which are generated on the basis of a system clock or the like (step 301), and it is executed (step 302).

Subsequently, the result of execution of the executed test routine Ti is compared with expected data (step 303). In a case where the two are identical, "OK" is set in a test flag upon judging that any abnormality or error is not noted in the information system (step 304). In contrast, in a case where the two are unidentical, "NG" is set in the test flag upon judging that any error has developed (step 305). Then, the test program T is ended.

When the execution of the test program T has ended, the central processing unit 5 resumes the program status word PSW and the contents of the various registers from the stack area 12 in order to restart the program of the software area 2 having been interrupted (step 205).

Further, the central processing unit 5 checks the test flag set at the end of the execution of the test program T (step 206). In the case where the test flag is "OK", i.e., where no abnormality exists in the information system, the unit 5 turns "OFF" both the HSA access switch 14 and the MD flag (step 207) and returns to the interrupted program of the software area 2 (step 208).

On the other hand, in the case where the test flag is "NG", the central processing unit 5 turns "OFF" the HSA access switch 14 (step 209) and issues an error detection interruption to the service processor 6 (step 210), whereupon the operation of this central processing unit 5 is frozen (step 211).

Figure 4:
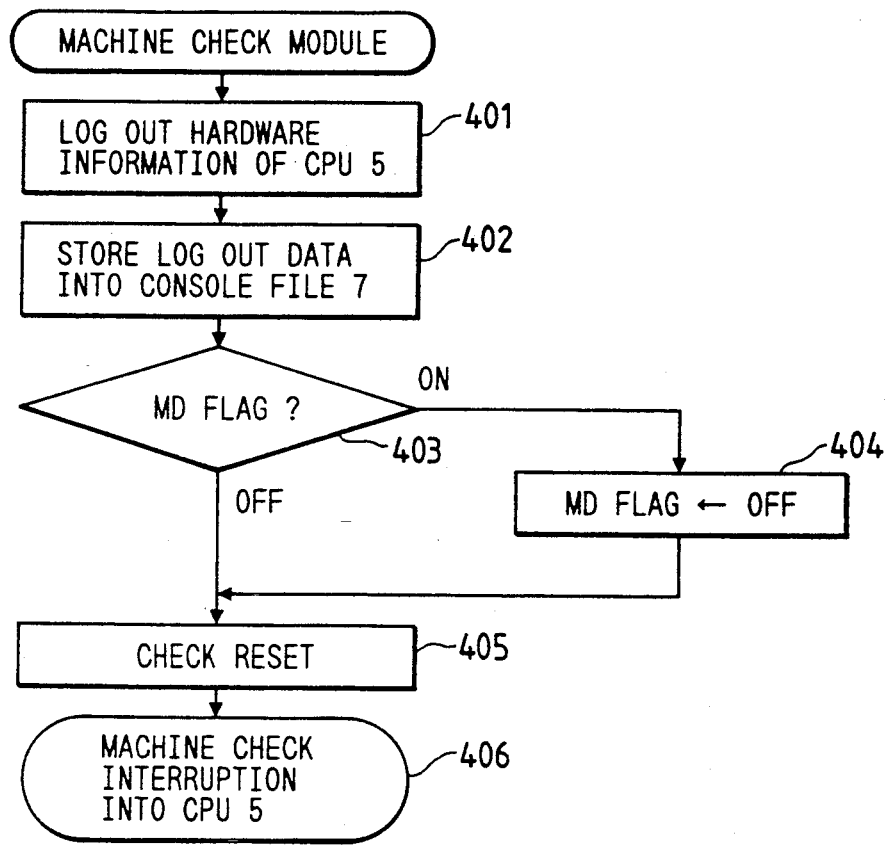
FIG. 4 is a flow chart for explaining an example of the operation of one embodiment of a service processor in FIG. 1.

The service processor 6 having received the error detection interruption starts operating the machine check module 9 included therein, as shown in FIG. 4.

The machine check module 9 first logs out hardware information such as the contents of the various registers of the central processing unit 5 (step 401), and stores the information in the log data file 10 of the console file device 7 (step 402).

Thereafter, the machine check module 9 checks the MD flag (step 403). This module 9 issues a reset signal for the central processing unit 5 (step 405) immediately when the MD flag is "OFF", and after turning "OFF" the MD flag (step 404) when the MD flag is "ON", whereby the frozen status of the central processing unit 5 is released. Subsequently, the service processor 6 starts a machine check interruption process routine which is started at the time of the hardware error of the central processing unit 5 (step 406).

The machine check interruption process routine reports the occurrence of the hardware error to the program, such as the operating system, under execution in the software area 2, as the interruption at the occurrence of the hardware error.

As described above, according to this embodiment, the test program T which is stored in the hardware area 3 of the main storage 1 and which is described with the general instructions is cyclically started with an opportunity at the interruption from the test timing module 8 of the service processor 6, whereby the existence or nonexistence of the occurrence of any error in the information system is checked. The embodiment therefore brings forth the effect that any logic error, for example, the disorder of a preceding control during the execution of microinstructions, which is difficult of detection with a microdiagnostic program described at the level of the microinstructions, can be reliably detected.

Besides, in a case where any error has been detected, the machine check module 9 of the service processor 6 is started to record detailed hardware information items such as the contents of the various registers in the central processing unit 5 etc., into the log data file 10 of the console file device 7. By referring to the detailed hardware information items, therefore, the resumption process, analysis etc. of the error can be appropriately performed.

Further, since the test program T to be stored in the hardware area 3 is described with the general instructions, there is the advantage that the test program T can be readily transplanted into a different kind of information processor having the same instruction scheme.

Although, in the above, the invention made by the inventors has been concretely described in conjunction with embodiments, it is a matter of course that the present invention is not restricted to the foregoing embodiments, but that it can be variously altered within a scope not departing from the purport thereof.

By way of example, the method of starting the test program is not restricted to setting the opportunity at the interruption request from the test timing module of the service processor as exemplified in the embodiment, but it is also allowed to employ, e.g., an interval timer which is disposed within the central processing unit.

In addition, a process such as I/O patrol having heretofore been performed by an operating system or the like may well be executed by the present invention in such a way that information items on the peripheral equipment such as various input/output devices are stored in part of the hardware area of the main storage beforehand, whereupon they are referred to during the execution of the test program of the present invention.

Effects which are attained by typical aspects of performance of the present invention are briefly explained as follows:

In an information processor having a central processing unit, a main storage which is accessed by the central processing unit, and an input/output processing unit which controls transfer of information between the central processing unit as well as the main storage and exterior of the information processor; the present invention consists in that a memory area of said main storage is partitioned into a software area and a hardware area, that a train of instructions for inspecting said central processing unit, said main storage and said input/output processing unit are stored in said hardware area, and that said central processing unit executes a program stored in said software area and the instruction train stored in said hardware area, alternately at desired intervals so as to decide existence or nonexistence of occurrence of an error on the basis of an executed result of said instruction train. Thus, the train of instructions to be stored in part of the hardware area of the main storage are described with general instructions, whereby even an error which is difficult of detection with a microdiagnostic program and which is ascribable to, e.g., the disorder of control logic during the execution of a microprogram can be reliably detected.

Besides, when any error has been detected, the error process routine of a service processor is started by an interruption process as a hardware error detected by the central processing unit, and the operation of recording the status of hardware such as the central processing unit into a console file device is performed in the error process routine. Thus, the status of the hardware at the occurrence of the error is permitted to be grasped in detail, and the analysis of the error, a resumption process, etc. can be performed more appropriately than in an error detection technique which is based on a test program at an ordinary program level.

In addition, since the train of instructions for checking the existence or nonexistence of any error are described with the general instructions, a test program can be readily transplanted into a different information processor having the same instruction scheme, unlike the microdiagnostic program etc. which depend intensely upon the hardware.

What is claimed is:

1. In an information processor having a central processing unit for executing general programs, a main storage accessible by the central processing unit and partitioned into a software area for storing the general programs and a hardware area being inaccessible to the general programs, and an input/output processing unit for controlling transfer of information between the central processing unit and the main storage and to and from an associated external device, an error detection method comprising the steps:

storing in said hardware area a test routine, for inspecting at least one of the central processing unit, the main storage and the input/output processing unit;

alternately exclusively executing, at predetermined time intervals, the general programs stored in the software area and the test routine stored in the hardware area;

comparing a result of the execution of the test routine with an expected correct result;

detecting occurrence of an error when the result of the execution of the test routine is not identical with the expected result;

in response to detecting said error, interrupting the central processing unit; and, after interrupting the central processing unit, starting execution of an error process routine in a service processor comprising said associated external device.

2. The error detection method of claim 1, further comprising the steps of freezing the central processing unit from further execution of the general programs when the result of the execution of the test routine is not identical with the expected data; and, recording a status of internal registers of the central processing unit into a log data file of said service processor by means of the error processing routine.

3. The error detection method of claim 2 further comprising the step of restarting the central processing unit to resume execution f the general programs after the execution of the error processing routine and after the recording of the status of the central processing routine into said log data file.

4. The error detection method of claim 1, further comprising the step of generating a timing command signal at said predetermined intervals by said service processor, the timing signal commanding the central processing unit to start execution of the test routine.

5. An error detection apparatus for use with an information processor having a central processing unit for executing general programs, a main storage accessed by the central processing unit, and an input/output processing unit for controlling exchange of information between the central processing unit and the main storage with an associated device external to the information processor, an error detection apparatus comprising:
means for partitioning the main storage into a software area for storing the general programs, and a hardware area for storing test programs, the test programs comprising an instruction train for inspecting functionality of at least one of the central processing unit, the main storage, and the input/output processing unit;
means for inhibiting the general programs from accessing the hardware area;
means for commanding the central processing unit to alternately exclusively execute the general programs stored in the software area and the instruction train stored in said hardware area at desired predetermined intervals; and
means for recognizing an information processor error based on the execution of the instruction train.

6. The error detection apparatus of claim 5, further comprising:
means for generating a result from the execution of the instruction train;
means for comparing the result with predetermined expected data;
means, responsive to a mismatch between the result of the instruction train execution and the expected data, for generating an interrupt error signal; and,
means for freezing the information processor in response to the interrupt error signal.

7. The error detection apparatus of claim 5, wherein said information processor comprises a service processor means for periodically interrupting the central processing unit and for execution of an error process routine upon receipt of the interrupt error signal, the error process routine retrieving a status of internal registers of the central processing unit; and,
means for recording the status of the central processing unit into a data log file of said associated external device.

8. The error detection apparatus of claim 7, wherein said associated external device comprises a test timing module means for cyclically interrupting the central processing unit to start execution of the instruction train.

9. The error detection apparatus of claim 7 further comprising means for restarting the central processing unit to resume execution of the general programs after the execution of the error processing routine and after the recording of the status of the internal registers of the central processing routine into said associated external device.

10. An error detection apparatus for use in combination with an information processor having a central processing unit for executing general programs, a main storage accessible by the central processing unit, and an input/output processing unit for controlling exchange of information between the central processing unit and the main storage with an associated device external to the information processor, an error detection apparatus comprising:
means for partitioning the main storage into a software area in which the general programs are stored, and a hardware area for storing test programs inaccessible to the general programs, each test program comprising an instruction train for inspecting at least one of the central processing unit, the main storage, and the input/output processing unit;
means for inhibiting the general programs from accessing the hardware area;
means for commanding the central processing unit to alternately exclusively execute the general programs stored in the softwares area and a one instruction train stored in said hardware area at predetermined intervals, the execution of the one instruction train generating a result;
means for recognizing an information processor error and issuing an interrupt error signal responsive to said result of the execution of the one instruction train;
service processor means for execution of an error process routine upon receipt of the interrupt error signal, the error process routine executing a retrieval of a status of internal registers of the central processing unit; and,
means for recording the status of the internal registers of the central processing unit into a data log file of a console file device connected to the service processor means.

* * * * *

UNITED STATES PATENT AND TRADEMARK OFFICE
CERTIFICATE OF CORRECTION

PATENT NO. : 5,172,378
DATED : December 15, 1992
INVENTOR(S) : Masayuki Sugioka, et al.

It is certified that error appears in the above-identified patent and that said Letters Patent is hereby corrected as shown below:

Claim 3, column 7, line 15, delete "f" and substitute therefor --of--; and, lines 16-18, delete "and after the recording of the status of the central processing routine into said log data file".

Claim 10, column 8, line 42, delete "softwares" and substitute therefor --software--.

Signed and Sealed this

Twenty-third Day of November, 1993

Attest:

BRUCE LEHMAN

Attesting Officer   Commissioner of Patents and Trademarks